United States Patent
Muradyan et al.

(10) Patent No.: US 8,275,181 B2
(45) Date of Patent: Sep. 25, 2012

(54) METHOD FOR TRACKING OF CONTRAST ENHANCEMENT PATTERN FOR PHARMACOKINETIC AND PARAMETRIC ANALYSIS IN FAST-ENHANCING TISSUES USING HIGH-RESOLUTION MRI

(75) Inventors: Naira Muradyan, White Plains, NY (US); Andreas Muehler, Mountain Lake, NJ (US)

(73) Assignee: iCAD, Inc., Nashua, NH (US)

( * ) Notice: Subject to any disclaimer, the term of this patent is extended or adjusted under 35 U.S.C. 154(b) by 744 days.

(21) Appl. No.: 11/919,938

(22) PCT Filed: May 8, 2006

(86) PCT No.: PCT/US2006/017612
§ 371 (c)(1),
(2), (4) Date: Feb. 27, 2009

(87) PCT Pub. No.: WO2006/121967
PCT Pub. Date: Nov. 16, 2006

(65) Prior Publication Data
US 2009/0190806 A1    Jul. 30, 2009

(51) Int. Cl.
*G06K 9/00* (2006.01)
(52) U.S. Cl. .................................................. 382/128
(58) Field of Classification Search .................. None
See application file for complete search history.

(56) References Cited

OTHER PUBLICATIONS

J.J. Van Vaals et al., "Keyhole Method for Accelerating Imaging of Contrast Agent Uptake", J. Magn. Reson. Imaging 3, pp. 671-675, 1993.
A.G. Webb et al., "Applications of Reduced-Encoding MR Imaging with Generalized-Series Reconstruction (RIGR)1", J. Magn. Reson. Imaging 3, pp. 925-928, 1993.
Merrifield et al., "Multi-Spectral Cardiac MRI with Generalized Series Reconstruction for Reduced k-Space Encoding", www2.cmp.uea.ac.uk/~et/miva2002/papers/paper_09.doc, MIUA, Jul. 2002.
S. Heiland et al., "Does the "Keyhole" Technique Improve Spatial Resolution in MRI Perfusion Measurements? A Study in Volunteers", Neuroradiology. Jul. 2001;43 (7):518-24.

(Continued)

*Primary Examiner* — Roberto Velez
(74) *Attorney, Agent, or Firm* — William A. Loginov, Esq.; Loginov & Associates, PLLC

(57) ABSTRACT

A method for performing a high-resolution pharmacokinetic analysis for calculation of tissue parameters for a fast-enhancing tissue enables medical personnel to accurately determine pharmacokinetic parameters in fast-enhancing tissues. The method includes obtaining mask image data of the tissue when it is in a steady state condition, obtaining a time series of image data of the tissue when the contrast agent is flowing in the tissue, and increasing a spatial resolution of the time series of image data using the mask image data to obtain a time series of increased spatial resolution image data. The method further includes performing a pharmacokinetic analysis to obtain data including at least one parameter that characterizes the tissue, providing a multi-parameter look-up table derived from a combination of two or more parameters, and providing a display including one parameter or a parametric image, where the parametric image is derived from the look-up table.

23 Claims, 11 Drawing Sheets

OTHER PUBLICATIONS

A. Gossmann et al., "Prostate Cancer Tumor Grade Differentiation with Dynamic Contrast-enhanced MR Imaging in the Rat: Comparison of Macromolecular and Small-Molecular Contrast Media-Preliminary Experience", Radiology, 1999, 213;265-272.

J. X. Ji et al., "Optimizing Data Acquisition and Image Reconstruction for Generalized Series Dynamic Imaging", Proc. 11th Ann. Meeting Intl. Soc. Mag. Reson. Med., p. 1000, Toronto, Ontario, Canada, Jul. 2003.

MJ White et al., "Rapid Dynamic Contrast-Enhanced MRI Using Reduced Acquisition and Constrained Reconstruction: Pilot Work for Dynamic Liver Study", In: Proceedings of Medical image Understanding and Analysis, the University of Portsmouth, Great Britain, 4 pages (2002).

E. Furman-Haran et al., "Parametric Analysis of Breast MRI", 1: Journal Computer Assisted Tomography. May-Jun. 2002;26(3):376-86.

METHOD FOR TRACKING OF CONTRAST ENHANCEMENT PATTERN FOR PHARMACOKINETIC AND PARAMETRIC ANALYSIS IN FAST-ENHANCING TISSUES USING HIGH-RESOLUTION MRI

TECHNICAL FIELD

The present invention relates to a system and method for use with medical imaging and, more particularly to a system and method for obtaining and analyzing images from tissues which exhibit fast uptake of a contrast agent.

BACKGROUND INFORMATION

There is a growing trend in the development of non-invasive methods for detection and characterization of tumors. As a second most common cause of cancer-related death in men, prostate cancer is a usual object for many research studies. The appropriate tumor localization and staging are very important for determining the best choice of treatment. The most common diagnostic methods for prostate cancer are transrectal ultrasound and conventional magnetic resonance imaging (MRI). Unfortunately, these methods are not always able to differentiate and characterize the cancerous and healthy prostate tissues.

A comparatively new method for characterization of tumor microvasculature is the dynamic contrast enhanced (DCE) MRI. Originally developed to describe the blood-brain barrier permeability, DCE MRI was later used to help identify breast lesions as being malignant, benign, and so forth. The non-invasive DCE-MRI is very helpful not only for initial and early diagnosis, but also for painless follow-up treatments.

For DCE-MRI, the multi-slice images are acquired before, and during, contrast agent infusion. Subsequently, signal intensity versus time curves are analyzed using appropriate models for quantitative assessment of permeability and microvasculature of healthy and cancerous tissues. Those models rely on pixel-by-pixel analysis and high-spatial resolution of images, which are necessary to avoid volume averaging of contrast enhancement patterns. However, the high-spatial resolution poses some limitations on temporal resolution (i.e., how fast images can be taken). In some tissues with slow dynamic of contrast agent (e.g., in breast tissue), the usual temporal resolution achievable in most dynamic contrast enhanced (DCE) MRI exams is sufficient for accurate and reliable pharmacokinetic analysis and calculation of resulting parameters, such as vascular permeability (k-trans) and extracellular space or volume (V).

However, dynamic imaging in general, and pharmacokinetic methods in particular, may not provide sufficient temporal resolution to monitor the rapid dynamics of the contrast agent exhibited in fast-enhancing tissues such as prostate tissue. This is particularly true for the majority of currently deployed MRI scanners, which have limited gradient strength and cannot perform sequences fast enough. Moreover, some improvement of spatial resolution of prostate tissue can also be obtained using an endorectal coil. However, this approach has been avoided because of patient discomfort.

SUMMARY OF THE INVENTION

The present invention addresses the above and other issues by providing a system and method for providing a high-resolution pharmacokinetic analysis for calculation of tissue parameters for fast-enhancing tissues such as prostate tissue.

According to one aspect, the invention involves a method for performing a high-resolution pharmacokinetic analysis for calculation of tissue parameters for a fast-enhancing tissue. The method includes obtaining mask image data of the fast-enhancing tissue when the fast-enhancing tissue is in a steady state condition, obtaining a time series of image data of the fast-enhancing tissue when the contrast agent is flowing in the fast-enhancing tissue, and increasing a spatial resolution of the time series of image data using the mask image data to obtain a time series of increased spatial resolution image data. The method further includes performing a pharmacokinetic analysis of the increased spatial resolution image data to obtain data including at least one pharmacokinetic parameter that characterizes the fast-enhancing tissue, providing a multi-parameter look-up table derived from a combination of two or more pharmacokinetic parameters, and providing a display including the at least one pharmacokinetic parameter or a parametric image, the parametric image being derived from the multi-parameter look-up table.

In one embodiment, the steady state condition is before injection of a contrast agent, or after injection of the contrast agent. The fast-enhancing tissue includes prostate tissue. In another embodiment, the mask image data is obtained from a high-spatial resolution scan, and the time series of image data is obtained from a low-spatial resolution dynamic scan. In still another embodiment, the mask image data and the time series of image data are obtained using the same repetition time, flip angle, and echo time, and the mask image data and the time series of image data each include the same anatomical volume. In yet another embodiment, increasing a spatial resolution of the time series of image data comprises combining low- and high-spatial resolution image data. In other embodiments, combining the low- and high-spatial resolution image data includes transforming the low- and high-spatial resolution image data to a spatial frequency domain using Fourier transformation, and combining each of a series of low spatial frequencies of the low-spatial resolution images with high spatial frequencies of the high-spatial resolution image to form a complete spatial frequency volume. In another embodiment, performing a pharmacokinetic analysis of the increased spatial resolution image data comprises applying an analysis model to the increased spatial resolution image data.

According to another aspect, the invention involves a program storage device readable by a machine, tangibly embodying a program of instructions executable by the machine to perform method steps for performing a high-resolution pharmacokinetic analysis for calculation of tissue parameters for a fast-enhancing tissue. The method steps include obtaining mask image data of the fast-enhancing tissue when the fast-enhancing tissue is in a steady state condition, obtaining a time series of image data of the fast-enhancing tissue when the contrast agent is flowing in the fast-enhancing tissue, and increasing a spatial resolution of the time series of image data using the mask image data to obtain a time series of increased spatial resolution image data. The method steps further include performing a pharmacokinetic analysis of the increased spatial resolution image data to obtain data including at least one pharmacokinetic parameter that characterizes the fast-enhancing tissue, providing a multi-parameter look-up table derived from a combination of two or more pharmacokinetic parameters, and providing a display including the at least one pharmacokinetic parameter or a parametric image, the parametric image being derived from the multi-parameter look-up table.

In one embodiment, the steady state condition is before injection of a contrast agent, or after injection of the contrast agent. The fast-enhancing tissue includes prostate tissue. In another embodiment, the mask image data is obtained from a high-spatial resolution scan, and the time series of image data is obtained from a low-spatial resolution dynamic scan. In still another embodiment, the mask image data and the time series of image data are obtained using the same repetition time, flip angle, and echo time, and the mask image data and the time series of image data each include the same anatomical volume. In yet another embodiment, increasing a spatial resolution of the time series of image data comprises combining low- and high-spatial resolution image data. In other embodiments, combining the low- and high-spatial resolution image data includes transforming the low- and high-spatial resolution image data to a spatial frequency domain using Fourier transformation, and combining each of a series of low spatial frequencies of the low-spatial resolution images with high spatial frequencies of the high-spatial resolution image to form a complete spatial frequency volume. In another embodiment, performing a pharmacokinetic analysis of the increased spatial resolution image data comprises applying an analysis model to the increased spatial resolution image data.

According to still another aspect, the invention involves a system for performing a high-resolution pharmacokinetic analysis for calculation of tissue parameters for a fast-enhancing tissue. The system includes means for obtaining mask image data of the fast-enhancing tissue when the fast-enhancing tissue is in a steady state condition, means for obtaining a time series of image data of the fast-enhancing tissue when the contrast agent is flowing in the fast-enhancing tissue, and means for increasing a spatial resolution of the time series of image data using the mask image data to obtain a time series of increased spatial resolution image data. The system further includes means for performing a pharmacokinetic analysis of the increased spatial resolution image data to obtain data including at least one pharmacokinetic parameter that characterizes the fast-enhancing tissue, means for providing a multi-parameter look-up table derived from a combination of two or more pharmacokinetic parameters, and means for providing a display including the at least one pharmacokinetic parameter or a parametric image, where the parametric image is derived from the multi-parameter look-up table.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION OF THE INVENTION

Enhancement patterns in tissues are mainly determined by the blood flow to the tissue and by the vascular permeability of the tissue vessels. For pharmacokinetic analysis and calculation of physiologic parameters, it is necessary to separate the flow and permeability contributions. Separating the flow and permeability contributions is only possible if the enhancement kinetics can be monitored with sufficient temporal resolution. As previously mentioned, dynamic imaging in general may not provide sufficient temporal resolution to monitor such rapid enhancement behavior. Low-resolution magnetic resonance (MR) images (with a matrix of 128×128 voxels or lower) have been previously employed to examine such fast enhancement behavior. However, this method causes the image voxels (i.e., volume elements) to be large, and volume-averages the enhancement patterns in the image voxels. This result is not acceptable because cancer is known to be very heterogeneous in its enhancement patterns, and such heterogeneity can be used as diagnostic criteria. Thus far, for the previously described reasons, it has been impossible to perform a high-resolution pharmacokinetic analysis for calculation of tissue parameters for fast-enhancing tissues.

Because of fast blood flow and, consequently, fast flow of the contrast agent in the tissue, and the high vascular permeability in normal prostate tissue, acquiring high-resolution MR images frequently enough to record the contrast agent flow in the initial phase is critical and can serve as an example of such fast-enhancing tissues. However, currently available imaging techniques do not allow for prostate imaging with simultaneous high-spatial and temporal resolution with the possibility for pharmacokinetic analysis of contrast enhancement, such as by using pharmacokinetic and parametric models.

The present invention includes a system and method for combining high temporal and high-spatial resolution information acquired during two different phases of the magnetic resonance (MR) examination and enables post-processing using dynamic models with a high-spatial resolution (e.g., a matrix of 256×256 voxels or better), and a high temporal resolution (e.g., thirty seconds or faster).

Figure 1:
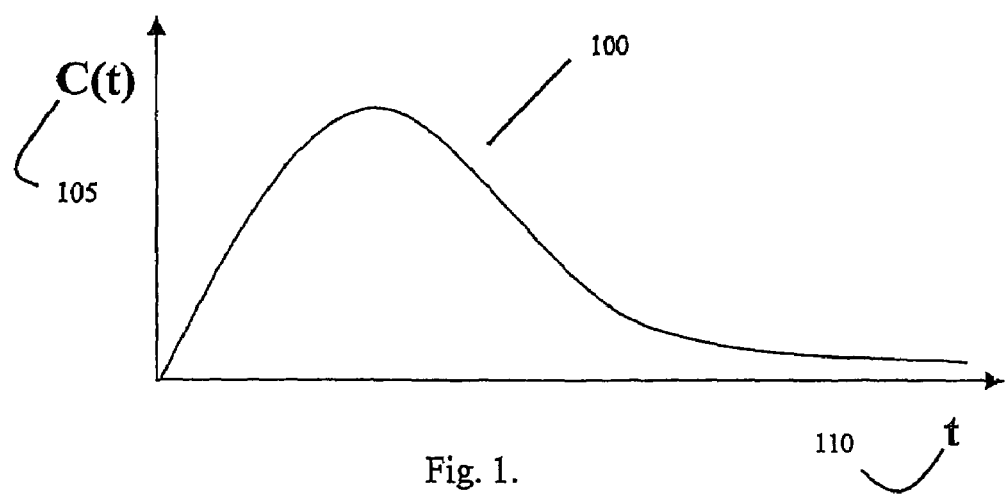
FIG. 1 is an illustrative plot of contrast agent concentration versus time, according to one embodiment of the invention.

Referring to FIG. 1, in one embodiment, an illustrative plot 100 of contrast agent concentration (C(t)) 105 versus time (t) 110 is shown. The concentration C(t) 105 and, consequently, the detected MRI signal intensity, exhibits a relatively quick initial rise to a peak. The concentration C(t) 105 subsequently exhibits a relatively quick decrease, which is indicative of malignant tissue. As previously mentioned, high-spatial resolution image data of the tissue can be obtained before, or well after, injection of the contrast agent, since the corresponding low temporal resolution does not result in a significant loss of information. Moreover, the high-spatial resolution image data can be acquired with more than one number of acquisitions, which improves the quality of the image by reducing noise.

When the contrast agent is moving through the tissue, high temporal resolution data is needed to capture the dynamic properties of the tissue. A consequence of obtaining high temporal resolution data is that it must be obtained at a lower spatial resolution. However, by combining the low- and high-spatial resolution image data, high-resolution image data, which also captures the dynamic properties of the tissue, can be obtained.

Figure 2:
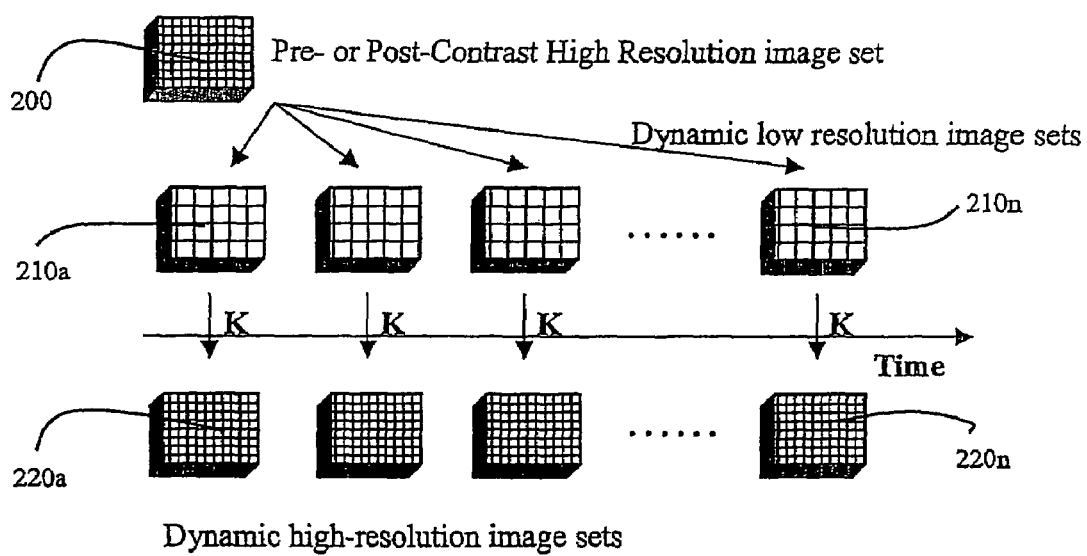
FIG. 2 is an illustrative block diagram of a method for combining low- and high-spatial resolution image data, according to one embodiment of the invention.

Referring to FIG. 2, in one embodiment, an illustrative block diagram of a method for combining low- and high-spatial resolution image data is shown. First, a set of high-spatial resolution images 200 covering a suspicious body volume is acquired (via an MRI machine) before injection of a contrast agent into the suspicious body volume. In another embodiment, the high-spatial resolution images are acquired well after the injection of the contrast agent (e.g. 8-9 minutes after the injection for the prostate), when the tissue has returned to a steady state condition.

Next, a set of low resolution dynamic scans 210a-210n, over a desired time period during contrast agent infusion, is acquired with a desired time resolution.

Both sets of images typically cover the same anatomical volume, and should be obtained using the same scan parameters, such as repetition time (TR), flip angle, and echo time (TE). At least one spatial image dimension for a high-resolution image should be greater than the one for a low-resolution image: $N_{x(y,z)}^{high} > N_{x(y,z)}^{low}$, where $N^{high}_{x(y,z)}$ denotes the matrix dimensions of the high-spatial resolution data 200 (e.g., N=256), and $N^{low}_{x(y,z)}$ denotes the matrix dimensions of the low-spatial resolution data 210a-210n (e.g., N=128).

The low- and high-spatial resolution data 210a-210n, and 200 respectively, can be combined using various techniques to convert the low-spatial resolution dynamic scans 210a-210n into high-spatial resolution images 220a-220n.

Figure 3:
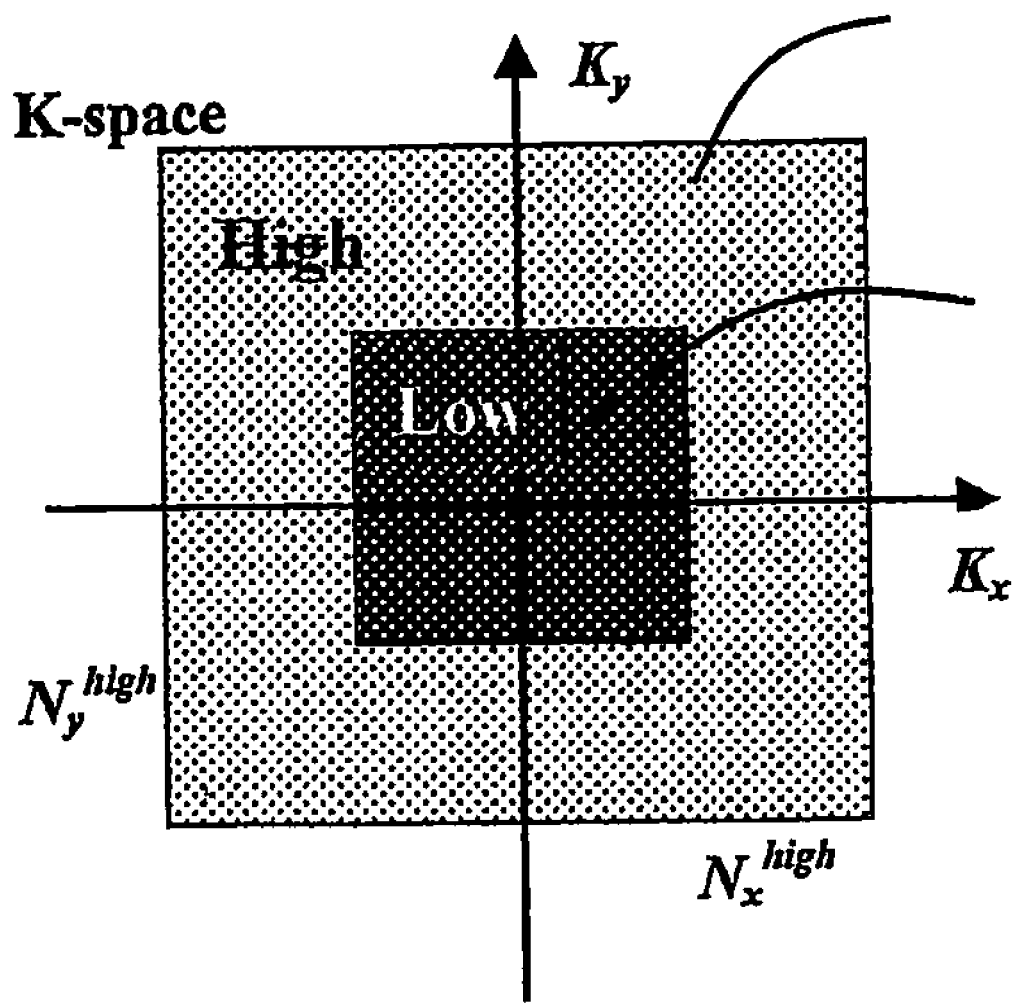
FIG. 3 is an illustrative k-space or spatial frequency diagram based on the combined low- and high-spatial resolution image data, according to one embodiment of the invention.

One possible approach for combining the low- and high-spatial resolution data (i.e., 210a-210n, and 200 respectively) involves the keyhole method (See e.g., J. J. van Vaals, M. E. Brummer, W. T. Dixon, H. H. Tuithof, H. Engels. Key-hole method for accelerating imaging of contrast agent uptake. J. Magn. Reson. Imaging, 3, pp 671-675, 1993, incorporated herein by reference). In the keyhole technique, all of the image sets 200, 210a-210n are transformed to the spatial frequency domain (k-space) using the Fourier transformation, as shown in FIG. 3. The Fourier transform relates each point in k-space to a spatial domain MRI image. The efficient Fast Fourier Transform (FFT) can be used when the image matrices are symmetric.

Referring to FIG. 3, in one embodiment, a k-space or spatial frequency diagram based on the combined low- and high-spatial resolution image data is shown. The k-space is divided into a central section 310, which represents the low-spatial frequencies, and an outer section 300, which represents the high-spatial frequencies. The central section is repeatedly acquired during contrast arrival from the data sets 210a-210n. Prior to the injection of the contrast agent, or well after the injection, the outer section 300 is acquired from the data set 200. During reconstruction, each time frame (e.g. dynamic images 220a-220n) is generated by combining a different central section 310, from one of the data sets 210a-210n, with the same outer section 300 from the data set 200, to form a complete k-space volume.

In this manner, new sets of dynamic images 220a-220n are created by combining the low-spatial frequency data of low-spatial resolution dynamic images 210a-210n with the high-spatial frequency data of the high-resolution pre-contrast image set 200. The dynamic images can then be used for an accurate and reliable pharmacokinetic analysis, and for calculation of tissue parameters such as vascular permeability (k-trans) and extracellular space (V). The dynamic images can also be used as an aide for diagnosing tissue.

Referring to FIG. 4-8, in one embodiment, various low- and high-spatial resolution images of the prostate are shown, which illustrate various benefits that are derived from the present system and method.

Figure 4:
FIG. 4 is an illustrative original low-spatial resolution image (128×128 voxels) of a prostate in an early enhancement phase, according to one embodiment of the invention.
Figure 5:
FIG. 5 is an illustrative original high-spatial resolution image (256×256 voxels) of a prostate before contrast agent injection, according to one embodiment of the invention.
Figure 6:
FIG. 6 is an illustrative original image of the prostate of FIG. 4 with improved spatial resolution (256×256 voxels) after application of the combining technique using the high-spatial resolution pre-contrast image of FIG. 5.

In the examples shown, the high-spatial resolution image has a 256×256×16 matrix (with 0.625×0.625×4 mm voxels) versus a 128×128×32 matrix (with 1.25×1.25×4 mm voxels) for high-temporal resolution dynamic images, and both sets cover the same anatomical volume of 16×16×64 cm. In particular, FIG. 4 illustrates an original low-spatial resolution image (128×128 voxels) of the prostate in an early enhancement phase. As can be seen, the level of detail is relatively poor. FIG. 5 illustrates an original high-spatial resolution image (256×256 voxels) of the prostate before contrast agent injection. This is the reference image that is used to increase the spatial resolution of the time-series data. FIG. 6 illustrates the same image of the prostate as in FIG. 4, but with improved spatial resolution (256×256 voxels) after application of the combining technique using the high-spatial resolution pre-contrast image of FIG. 5, according to the invention, and as previously described.

Figure 7:
FIG. 7 is an illustrative colored permeability image of the prostate obtained from a pharmacokinetic analysis using a dynamic series of images with an original low-spatial resolution image (128×128 voxels), according to one embodiment of the invention.
Figure 8:
FIG. 8 is an illustrative colored permeability image of the prostate obtained from a pharmacokinetic analysis of a dynamic series of images with improved spatial resolution (256×256 voxels), according to one embodiment of the invention.

FIG. 7 illustrates a permeability image of the prostate obtained from a pharmacokinetic analysis using the dynamic series of images with the original low-spatial resolution (128×128 voxels) (FIG. 4). FIG. 8 illustrates a permeability image of the prostate obtained from a pharmacokinetic analysis of the dynamic series of images with improved spatial resolution (256×256 voxels). In comparing the image shown in FIG. 8 with the image shown in FIG. 7, it can be seen that the level of detail of the image of the prostate is significantly improved and various features that are visible in the image shown in FIG. 8 are not apparent in the image shown in FIG. 7, thus verifying the effectiveness of the present invention.

After the pharmacokinetic analysis has been implemented, the direct pharmacokinetic parameters (e.g. permeability and extracellular space) can be displayed separately, or as a colorized overlay, over grayscale original images. Further, two or more pharmacokinetic parameters can be used to create a multi-parameter look-up table and corresponding parametric image of the tissue. If the pharmacokinetic analysis produces N parameters (N>=2), any two or more n parameters (2<=n<=N) can be used to create the multi-parameter look-up table. The n-dimensional space of the chosen n parameters span from minimal to maximal values. The n-dimensional space can be divided into two or more desirable sub-spaces, where each sub-space is assigned different color.

Further, a parametric image of the tissue can be created and displayed based on the tissue parameters and the corresponding multi-parameter look-up table. The voxels with different parameter sets will be assigned the corresponding sub-space color.

For example, if it is known that, for a specific tissue, cancerous voxels have a specific combination of n pharmacokinetic parameters (n>=2) versus normal tissues, then a desirable separation of that n-dimensional parametric space can be performed. Later, actual voxels in a real dataset can be colored according to corresponding pharmacokinetic parameters and the corresponding multi-parameter look-up table. The multi-parameter look-up table is typically derived from the knowledge of the parametric value (and the combinations of these parametric values) in two or more tissues that are intended to be differentiated. The multi-parameter look-up table, therefore, does not entail the use of a mathematical function. Instead, the look-up table is defined by customized areas that are assigned to an output color and/or intensity.

Figures 9A, 9B:
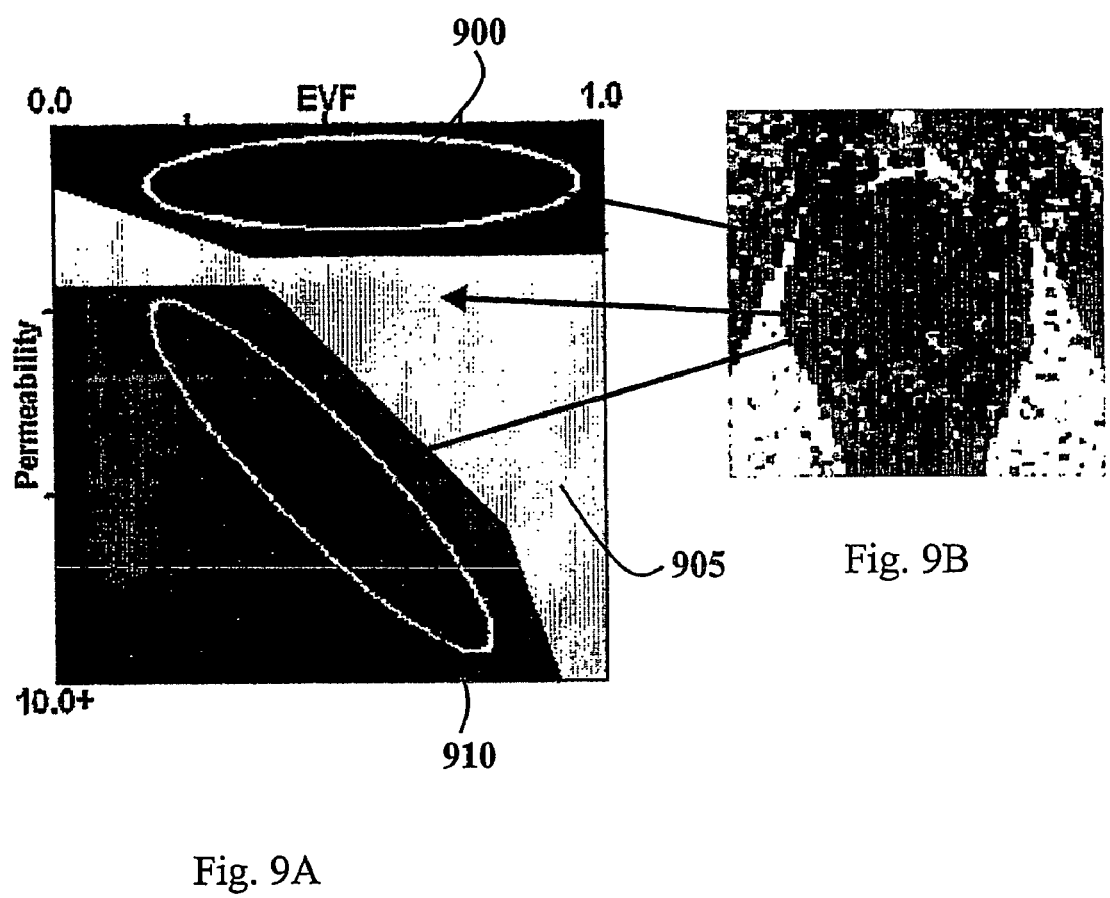
FIG. 9A is an illustrative multi-parameter look-up table, according to one embodiment of the invention.
FIG. 9B is an illustrative parametric image of a prostate corresponding to the multi-parameter look-up table of FIG. 9A.

Referring to FIGS. 9A and 9B, in one embodiment, a multi-parameter look-up table and a corresponding parametric image of a prostate is shown. Areas 900 and 910 correspond to combinations of permeability (ranges from 0-10 $min^{-1}$) and extracellular volume fraction (ranges from 0-1) of benign 900 and malignant 910 prostate tissues. The malignant areas 910 are manually defined (colored) as red, and the normal/benign areas 900 are manually defined (colored) as blue. An optional intermediate permeability/EVF combination 905 is manually defined (colored) as green.

FIG. 9B is an example of a parametric image after implementation of pharmacokinetic analysis. Every processed voxel in FIG. 9B is colored based on a corresponding permeability/EVF pair obtained from the multi-parameter look-up table of FIG. 9A. Voxels of FIG. 9B with a permeability/EVF pair corresponding to the red (malignant) region 910 are colored red, and voxels with a permeability/EVF pair corresponding to the blue benign) region 900 are colored blue.

Figure 10:
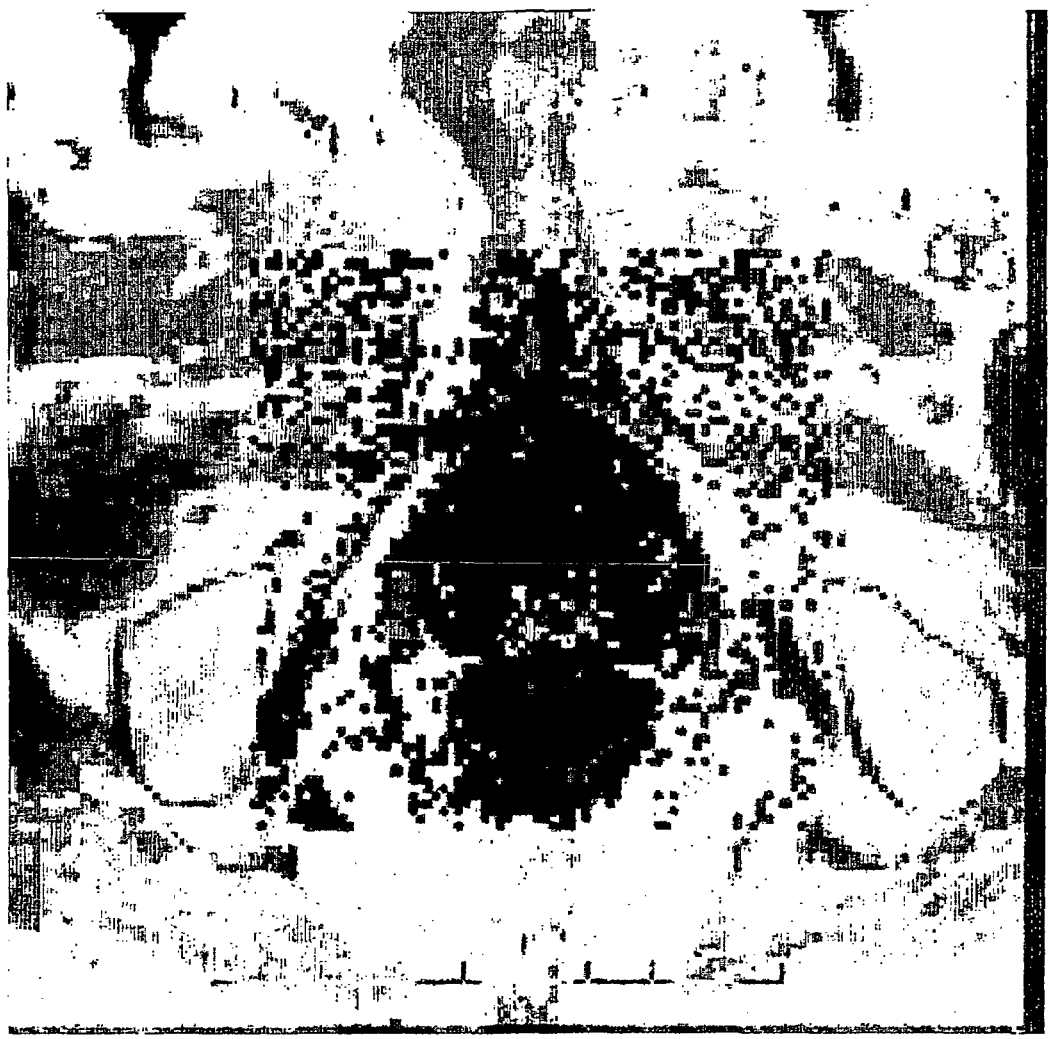
FIG. 10 is an illustrative colored parametric image of the prostate obtained from a pharmacokinetic analysis with further application of a multi-parameter look-up table using a dynamic series of images with the original low-spatial resolution (128×128 voxels), according to one embodiment of the invention.

Referring to FIG. 10, in one embodiment, a colored parametric image of the prostate obtained from a pharmacokinetic analysis with further application of a multi-parameter look-up table is shown. The parametric image of the prostate based on pharmacokinetic analysis results from using a dynamic series of images with the original low-spatial resolution (128×128 voxels).

Figure 11:
FIG. 11 is an illustrative colored parametric image of the prostate obtained from a pharmacokinetic analysis with further application of a multi-parameter look-up table using a dynamic series of images with improved spatial resolution (256×256 voxels), according to one embodiment of the invention.

Referring to FIG. 11, in one embodiment, another colored parametric image of the prostate obtained from a pharmacokinetic analysis with further application of a multi-parameter look-up table is shown. The parametric image of the prostate based on pharmacokinetic analysis results from using dynamic series of images with improved spatial resolution (256×256 voxels).

In comparing the image shown in FIG. 10 with the image shown in FIG. 11, it can be seen that the level of detail of the image of the prostate is significantly improved and various features that are visible in the image shown in FIG. 11 are not apparent in the image shown in FIG. 10, thus verifying the effectiveness of the present invention.

Figure 12:
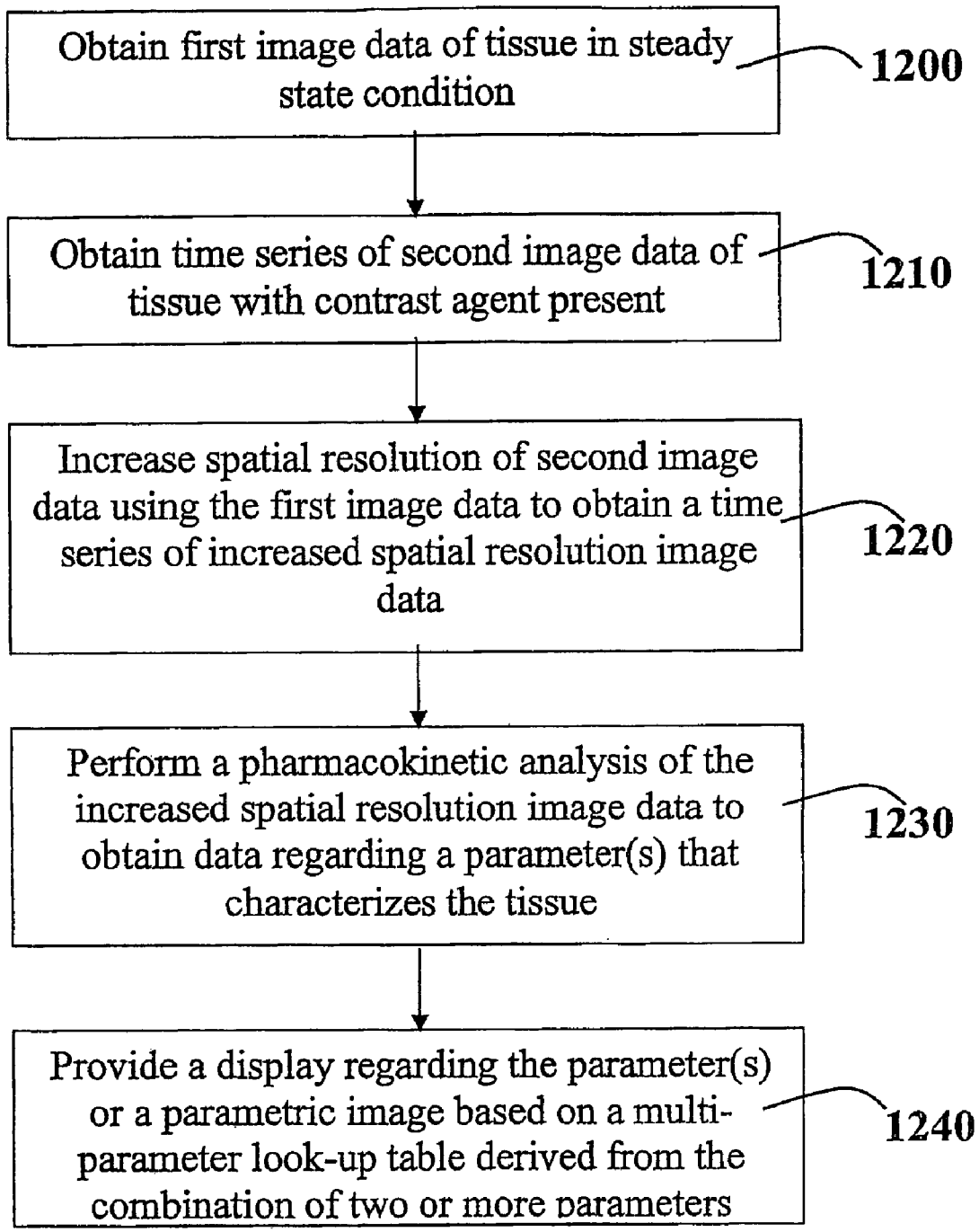
FIG. 12 is an illustrative flow diagram of a computer-implemented method for tracking of contrast enhancement pattern for pharmacokinetic and parametric analysis in fast-enhancing tissues using high-resolution magnetic resonance imaging, according to one embodiment of the invention.

Referring to FIG. 12, in one embodiment, a flow diagram of a method (which can be computer-implemented) for tracking of contrast enhancement pattern for pharmacokinetic and parametric analysis in fast-enhancing tissues using high-resolution magnetic resonance imaging is shown.

The computer-implemented method is implemented using a typical computer system coupled to and controlling an MRI system. The computer system can be any computer system that includes a processor, memory (e.g. random access memory (RAM)), a mass storage device (e.g., a hard disk), and a display (e.g., a monitor). The method, in one embodiment, is a computer program that is stored on the mass storage device, loaded into RAM, executed on the processor, and displays obtained data on the monitor.

The method includes obtaining first, mask image data of tissue when the tissue is in a steady state condition (Step 1200). Next, a time series of second image data of the tissue when a contrast agent is present (flowing) in the tissue is obtained (Step 1210). A spatial resolution of the second image data is then increased using the first image data to obtain a time series of increased spatial resolution image data (Step 1220). A pharmacokinetic analysis of the increased spatial resolution image data is performed to obtain data including at least one parameter, which characterizes the tissue (Step 1230). A display in then provided, which includes the pharmacokinetic parameters or a parametric image based on a multi-parameter look-up table derived from the combination of two or more pharmacokinetic parameters (Step 1240). The parametric image can be provided on a display screen of a computer, or on a hard copy print out, for example.

Note that, in addition to the keyhole method, other data sharing techniques can be used, such as Reduced-encoding by Generalized-series Reconstruction (RIGR). RIGR uses a set of non-Fourier basis functions for dynamic image reconstruction. In particular, this model estimates the unmeasured (high-spatial-resolution) parts of the dynamic images by transforming the k-space image onto a set of constrained sinusoidal basis functions, whereas the keyhole technique is limited by the number of dynamic encodings measured (See, e.g.; A. G. Webb, Z. P. Liang, R. L. Magin, P. C. Lauterbur. Reduced encoding imaging by generalized series reconstruction (RIGR): Applications to biological MRI. J. Magn. Reson. Imaging, 3, pp 925-928, 1993, incorporated herein by reference). A related technique is the two-reference RIGR (TRIGR) method, which uses two reference images instead of one.

Various advantages can be achieved by increasing the spatial resolution of the time series image data. For example, high-spatial resolution pharmacokinetic analysis techniques can be employed, examples of which include the Brix model, the Larsson model, and the Tofts model (See the discussion of these and other models in Paul S. Tofts, "Modeling Tracer Kinetics in Dynamic Gd-DTPA MR Imaging", JMRI 1997; 7:91-101, incorporated herein by reference).

The Brix model assumes a central intravascular compartment and a peripheral extravascular/extracellular compartment. The input of a contrast agent into the intravascular compartment is considered to be equal to the infusion rate of the contrast agent. The elimination of contrast agent occurs only through the central intravascular compartment, with a first-order rate constant.

The Larsson model is similar to the Brix model in that it is also based on the contrast material exchange between the capillary bed and the extracellular matrix, with exclusion from the intracellular compartment.

The Tofts model for Gd-based dynamic contrast-enhanced analysis was originally developed to measure changes in the blood-brain barrier. Time-dependent changes in the concentration of the contrast agent are assumed to be determined by its rate of exchange between the capillaries and the extracellular tissue spaces following the concentration gradient between these two compartments.

A further advantage of the present invention is that high-resolution parametric images of physiologic tissue parameters can be produced. Further, the present invention enables medical personnel to accurately determine pharmacokinetic parameters, such as vascular permeability, in fast-enhancing tissues. Moreover, prostate MRI and subsequent pharmacokinetic analysis can be performed using scanners with limited gradient strength, such as 1.5 T MRI scanners, without the use of an endorectal coil, thereby increasing patient comfort and willingness to undergo the imaging procedure.

It will be apparent to those skilled in the art that the techniques of the present invention can be implemented on a general purpose computer that includes at least one processor for executing any type of computer code devices, such as software, firmware, micro-code, or the like, to achieve the functionality described herein. A computer program product or program storage device that tangibly embodies such computer code devices, such as a memory device, can also be provided in a manner apparent to those skilled in the art.

Variations, modifications, and other implementations of what is described herein may occur to those of ordinary skill in the art without departing from the spirit and scope of the invention. Accordingly, the invention is not to be defined only by the preceding illustrative description.

What is claimed is:

1. A method for performing a high-resolution pharmacokinetic analysis for calculation of tissue parameters for a fast-enhancing tissue, comprising:
   obtaining mask image data of the fast-enhancing tissue when the fast-enhancing tissue is in a steady state condition;
   obtaining a time series of image data of the fast-enhancing tissue when a contrast agent is flowing in the fast-enhancing tissue;
   increasing a spatial resolution of the time series of image data using the mask image data to obtain a time series of increased spatial resolution image data;
   performing a pharmacokinetic analysis of the increased spatial resolution image data to obtain data including at least one pharmacokinetic parameter that characterizes the fast-enhancing tissue;
   providing a multi-parameter look-up table derived from a combination of two or more pharmacokinetic parameters; and
   providing a display including the at least one pharmacokinetic parameter or a parametric image, the parametric image being derived from the multi-parameter look-up table.

2. The method of claim 1 wherein the steady state condition is before injection of a contrast agent.

3. The method of claim 1 wherein the steady state condition is after injection of a contrast agent.

4. The method of claim 1 wherein the fast-enhancing tissue comprises prostate tissue.

5. The method of claim 1 wherein the mask image data is obtained from a high-spatial resolution scan.

6. The method of claim 1 wherein the time series of image data is obtained from a low-spatial resolution dynamic scan.

7. The method of claim 1 wherein the mask image data and the time series of image data are obtained using the same repetition time, flip angle, and echo time.

8. The method of claim 1 wherein the mask image data and the time series of image data each include a same anatomical volume.

9. The method of claim 1 wherein increasing a spatial resolution of the time series of image data comprises combining low- and high-spatial resolution image data.

10. The method of claim 9 wherein combining the low- and high-spatial resolution image data comprises:
    transforming the low- and high-spatial resolution image data to a spatial frequency domain using Fourier transformation; and
    combining each of a series of low spatial frequencies of the low-spatial resolution images with high spatial frequencies of the high-spatial resolution image to form a complete spatial frequency volume.

11. The method of claim 1 wherein performing a pharmacokinetic analysis of the increased spatial resolution image data comprises applying an analysis model to the increased spatial resolution image data.

12. A non-transitory program storage device readable by a machine, tangibly embodying a program of instructions executable by the machine to perform method steps for performing a high-resolution pharmacokinetic analysis for calculation of tissue parameters for a fast-enhancing tissue, the method steps comprising:
    obtaining mask image data of the fast-enhancing tissue when the fast-enhancing tissue is in a steady state condition;
    obtaining a time series of image data of the fast-enhancing tissue when the contrast agent is flowing in the fast-enhancing tissue;
    increasing a spatial resolution of the time series of image data using the mask image data to obtain a time series of increased spatial resolution image data;
    performing a pharmacokinetic analysis of the increased spatial resolution image data to obtain data including at least one pharmacokinetic parameter that characterizes the fast-enhancing tissue;
    providing a multi-parameter look-up table derived from a combination of two or more pharmacokinetic parameters; and
    providing a display including the at least one pharmacokinetic parameter or a parametric image, the parametric image being derived from the multi-parameter look-up table.

13. The method steps of claim 12 wherein the steady state condition is before injection of a contrast agent.

14. The method steps of claim 12 wherein the steady state condition is after injection of a contrast agent.

15. The method steps of claim 12 wherein the fast-enhancing tissue comprises prostate tissue.

16. The method steps of claim 12 wherein the mask image data is obtained from a high-spatial resolution scan.

17. The method steps of claim 12 wherein the time series of image data is obtained from a low-spatial resolution dynamic scan.

18. The method steps of claim 12 wherein the mask image data and the time series of image data are obtained using the same repetition time, flip angle, and echo time.

19. The method steps of claim 12 wherein the mask image data and the time series of image data each include a same anatomical volume.

20. The method steps of claim 12 wherein increasing a spatial resolution of the time series of image data comprises combining low- and high-spatial resolution image data.

21. The method steps of claim 20 wherein combining the low- and high-spatial resolution mage data comprises:
    transforming the low- and high-spatial resolution image data to a spatial frequency domain using Fourier transformation; and combining each of a series of low spatial frequencies of the low-spatial resolution images with high spatial frequencies of the high-spatial resolution image to form a complete spatial frequency volume.

22. The method steps of claim 12 wherein performing a pharmacokinetic analysis of the increased spatial resolution image data comprises applying an analysis model to the increased spatial resolution image data.

23. A system for performing a high-resolution pharmacokinetic analysis for calculation of tissue parameters for a fast-enhancing tissue, comprising:

means for obtaining mask image data of the fast-enhancing tissue when the fast-enhancing tissue is in a steady state condition;

means for obtaining a time series of image data of the fast-enhancing tissue when a contrast agent is flowing in the fast-enhancing tissue;

means for increasing a spatial resolution of the time series of image data using the mask image data to obtain a time series of increased spatial resolution image data;

means for performing a pharmacokinetic analysis of the increased spatial resolution image data to obtain data including at least one pharmacokinetic parameter that characterizes the fast-enhancing tissue;

means for providing a multi-parameter look-up table derived from a combination of two or more pharmacokinetic parameters; and means for providing a display including the at least one pharmacokinetic parameter or a parametric image, the parametric image being derived from the multi-parameter look-up table.

\* \* \* \* \*